(12) United States Patent
Amaki

(10) Patent No.: US 10,990,126 B1
(45) Date of Patent: Apr. 27, 2021

(54) WIRELESS COMMUNICATION TERMINAL WITH TOUCH PANEL AND PEN STORAGE

(71) Applicant: PANASONIC INTELLECTUAL PROPERTY MANAGEMENT CO., LTD., Osaka (JP)

(72) Inventor: Hidehiko Amaki, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/082,624

(22) Filed: Oct. 28, 2020

(30) Foreign Application Priority Data

Nov. 26, 2019 (JP) .............................. JP2019-213299

(51) Int. Cl.
*G06F 1/16* (2006.01)
*G06F 3/03* (2006.01)
*G06F 3/0354* (2013.01)
*H04M 1/02* (2006.01)

(52) U.S. Cl.
CPC .......... *G06F 1/1626* (2013.01); *G06F 1/1635* (2013.01); *G06F 1/1643* (2013.01); *G06F 3/03* (2013.01); *G06F 3/03545* (2013.01); *H04M 1/0262* (2013.01)

(58) Field of Classification Search
CPC .. G06F 3/03545; G06F 1/1626; G06F 1/1635; G06F 1/1643; H04M 1/0262
See application file for complete search history.

(56) References Cited

U.S. PATENT DOCUMENTS 9,124,681 B2 * 9/2015 Park ..................... H04M 1/21
2001/0044908 A1 * 11/2001 Siu ....................... G06F 1/1626
713/323

FOREIGN PATENT DOCUMENTS

JP 10-240420 9/1998
JP 2012-212218 11/2012
JP 2019-079235 5/2019

* cited by examiner

*Primary Examiner* — Laurence J Lee
(74) *Attorney, Agent, or Firm* — Greenblum & Bernstein, P.L.C.

(57) ABSTRACT

A wireless communication terminal includes: a body; a touch panel on a front surface and having top and bottom edges longer than left and right edges; a battery storage space; a pen storage space; and a substrate. The battery storage space is between a center line and a bottom edge of the body. A center point of the battery storage space is within a belt-shaped area having a width of 2 cm that spreads in a left-right direction and including the center point of the front surface. The pen storage space is between a bottom edge of the substrate and a top edge of the battery storage space and has a longitudinal axis parallel to a top of the battery storage space. A wiring connecting power terminals of two batteries stored in the battery storage space to the substrate does not intersect the pen storage space.

5 Claims, 5 Drawing Sheets

WIRELESS COMMUNICATION TERMINAL WITH TOUCH PANEL AND PEN STORAGE

CROSS-REFERENCES TO RELATED APPLICATIONS

This application is based on and claims priority to Japanese Patent Application No. 2019-213299 filed on Nov. 26, 2019, the enter contents of which are incorporated herein by reference.

FIELD

The present disclosure relates to a wireless communication terminal.

BACKGROUND

JP-A-H10-240420 discloses a tablet terminal including a flat box-shaped A4-sized body, a battery attached to a back surface of the body, a touch panel attached to a front surface of the body, and a pen storage space formed toward an inside of the body to house a stylus pen.

SUMMARY

Since the tablet terminal disclosed in JP-A-H10-240420 does not include an antenna for wireless communication, there are few restrictions on forming a pen storage space toward the inside of the body. On the contrary, in a wireless communication terminal including the antenna for the wireless communication, a priority is given to disposing the antenna at a position having a high reception characteristic, there are many restrictions when forming the pen storage space in the body.

An object of the present disclosure is to provide a wireless communication terminal in which a pen storage space is formed at an appropriate position in a body.

The present disclosure provides a wireless communication terminal including: a body that is a flat box; a touch panel that is on a front surface of the body; a battery storage space that is a space in the body; a pen storage space that is a space in the body for storing a pen for the touch panel, the pen storage space being hollow from a left or right side of the body to an inside of the body; and a substrate that is disposed within the body, wherein: the touch panel is rectangular with a top edge of the touch panel and a bottom edge of the touch panel that are longer than a left edge of the touch panel and a right edge of the touch panel, an upper area is on the front surface of the body and is an area between a top edge of the front surface and the top edge of the touch panel, a lower area is on the front surface of the body and is an area between a bottom edge of the front surface and the bottom edge of the touch panel, a left area is on the front surface of the body and is an area between a left edge of the front surface and the left edge of the touch panel, a right area is on the front surface of the body and is an area between a right edge of the front surface and the right edge of the touch panel, a width of the lower area is wider than both a width of the left area and a width of the right area, the battery storage space is in a space in the body between a center line of the body and a bottom edge of a back surface of the body, the center line passes through a center point of the front surface of the body, and the center line is in parallel with the top edge of the front surface or the bottom edge of the front surface, a center point of the battery storage space is within a belt-shaped area having a width of 2 cm that spreads in a left-right direction, and the belt-shaped area includes the center point of the front surface of the body, a longitudinal axis of the pen storage space is parallel to a top of the battery storage space, the substrate is in a space in the body above the battery storage space, the pen storage space is in a space between a bottom edge of the substrate and a top edge of the battery storage space, two batteries are stored side by side in the battery storage space, and power terminals of the two batteries face each other, and a wiring connects the power terminals to the substrate and does not intersect the pen storage space.

According to the present disclosure, a wireless communication terminal in which a pen storage space is formed at an appropriate position in a body can be provided.

DETAILED DESCRIPTION

Figure 1:
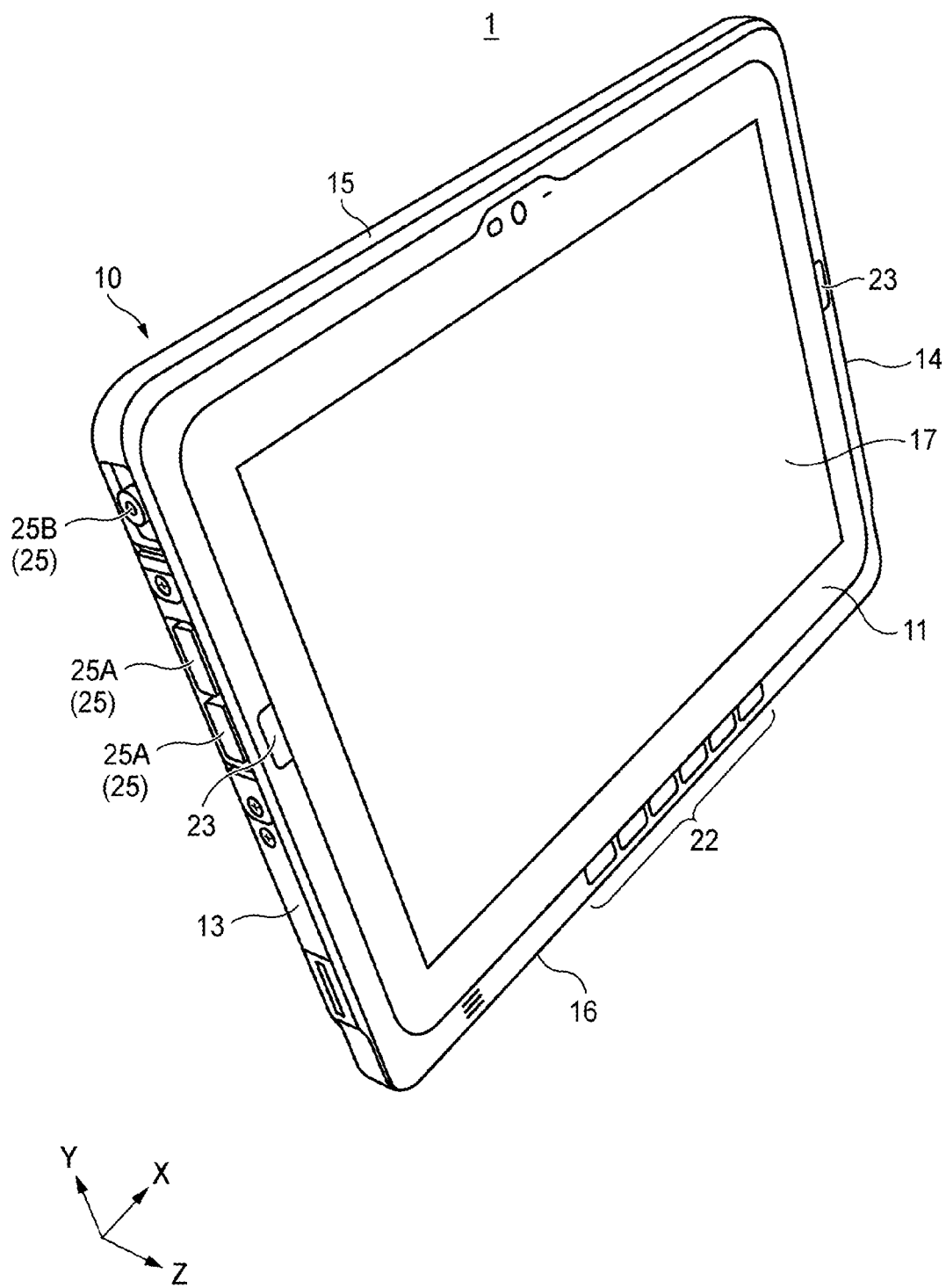
FIG. 1 is a perspective view showing an example of an external appearance of a wireless communication terminal according to an embodiment.

Hereinafter, an embodiment of the present disclosure will be described in detail with reference to the drawings as appropriate. However, unnecessarily detailed description may be omitted. For example, detailed description of well-known matters and repeated description of substantially the same configurations may be omitted. This is to avoid unnecessary redundancy in the following description and to facilitate understanding of those skilled in the art. The accompanying drawings and the following description are provided to those skilled in the art to fully understand the present disclosure, and are not intended to limit the claimed subject matter by these.

(Introduction to Present Disclosure)

In a case of a portable terminal including a touch panel of 7 inches or more, it is easier to operate a terminal by using a pen (for example, a stylus pen) with which the touch panel can be operated. Several methods for carrying the pen with the terminal can be considered as follows.

As a first method, a method of connecting the pen and the terminal with a strap can be considered. When the touch panel is 7 inches or more, since a movement distance of the pen on the touch panel is relatively long, a sufficient length is required for the strap. In this case, since the strap is relatively long, the pen fairly shakes when the terminal is carried, which is disturbing.

As a second method, a method of attaching an attachment and detachment structure in which a pen is attachable and detachable to a strap and removing the pen from the strap when in use can be considered. In this case, when carrying a terminal, the strap and the attachment and detachment structure may shake, and the attachment and detachment structure may be in contact with the terminal and damage the terminal. Further, when the second method is applied to a terminal including a touch panel of 7 inches or more, it is difficult for a user to hold the strap with one hand and remove the pen from the strap with the other hand while gripping the terminal.

As a third method, a method in which a magnet is provided on a side of a terminal and a pen is bonded to the magnet can be considered. However, in a case of a wireless communication terminal, since an antenna for wireless communication is disposed in the vicinity of a top surface and/or a side of a body in order to improve an antenna characteristic, it is difficult to attach a magnet that causes the antenna characteristic to deteriorate on the top surface and/or the side near the antenna. Further, when the magnet is provided on a back surface of the body, the pen bonded to the magnet becomes a protrusion on the back surface, and rattling occurs when the wireless communication terminal is placed on a desk. Further, it is difficult for the user to grip the terminal and take the pen on the back surface while looking at a touch panel.

As a fourth method, a method of storing a pen in a body of a terminal can be considered. In this case, since a space for storing the pen is required in the body, it is difficult to balance the space with an arrangement of other components included in a terminal such as an antenna, a substrate, and/or a battery.

A battery of the wireless communication terminal including the touch panel of 7 inches or more is larger in size and weight than a battery of a small wireless communication terminal such as a mobile phone. In view of stability of a weight balance of the wireless communication terminal, it is desirable that such a battery be attached to a position that is near a bottom surface of a body and evenly separated from both sides. Further, in the wireless communication terminal including the touch panel of 7 inches or more, as compared with an aspect ratio of the touch panel, when a ratio of a surface (front surface) to which the touch panel of the body of the wireless communication terminal is attached is made closer to a square shape, the weight balance is stable and carrying is easy.

In the wireless communication terminal, it is desirable that the antenna is disposed on a top surface and/or a side of the body, a connection port is disposed on a side of the body, and the substrate is collectively disposed in one place as much as possible without being too separated from the antenna and the connection port.

In view of the above, a wireless communication terminal in which a pen storage space for storing a pen is formed at an appropriate position in a body in consideration of the arrangement of other components will be described below.

Embodiment

Figure 2:
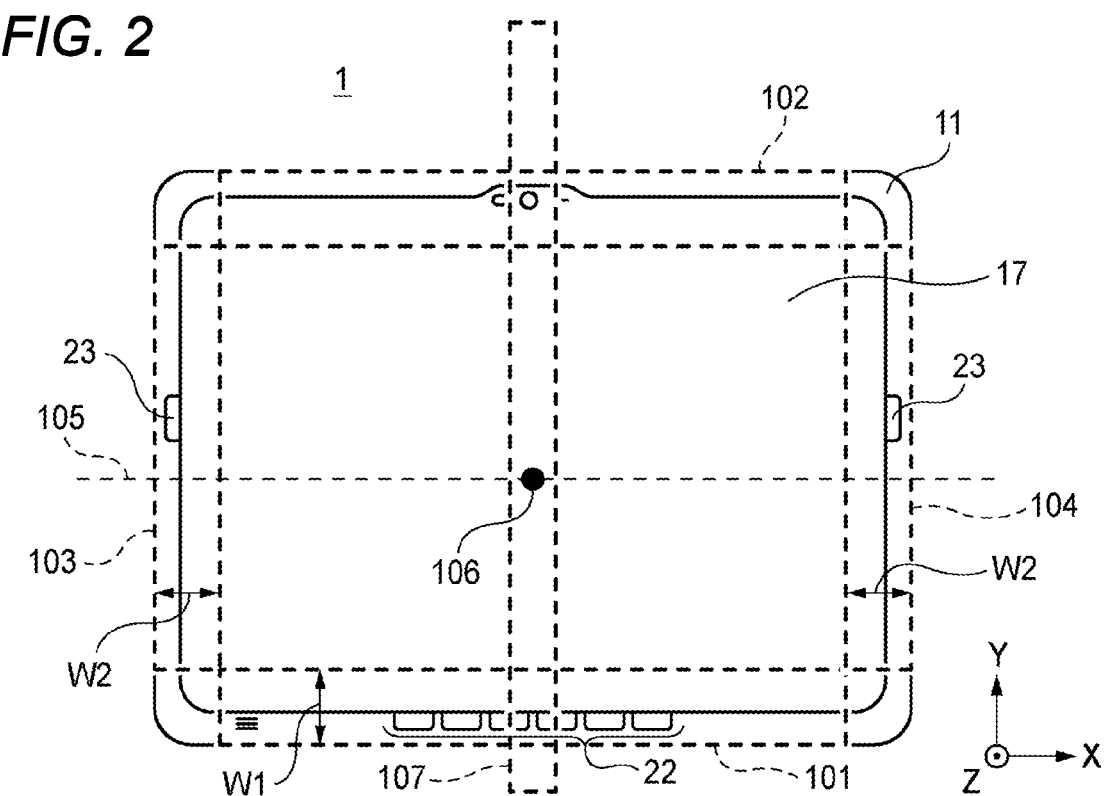
FIG. 2 is a front view showing the example of the external appearance of the wireless communication terminal according to the embodiment.
Figure 3:
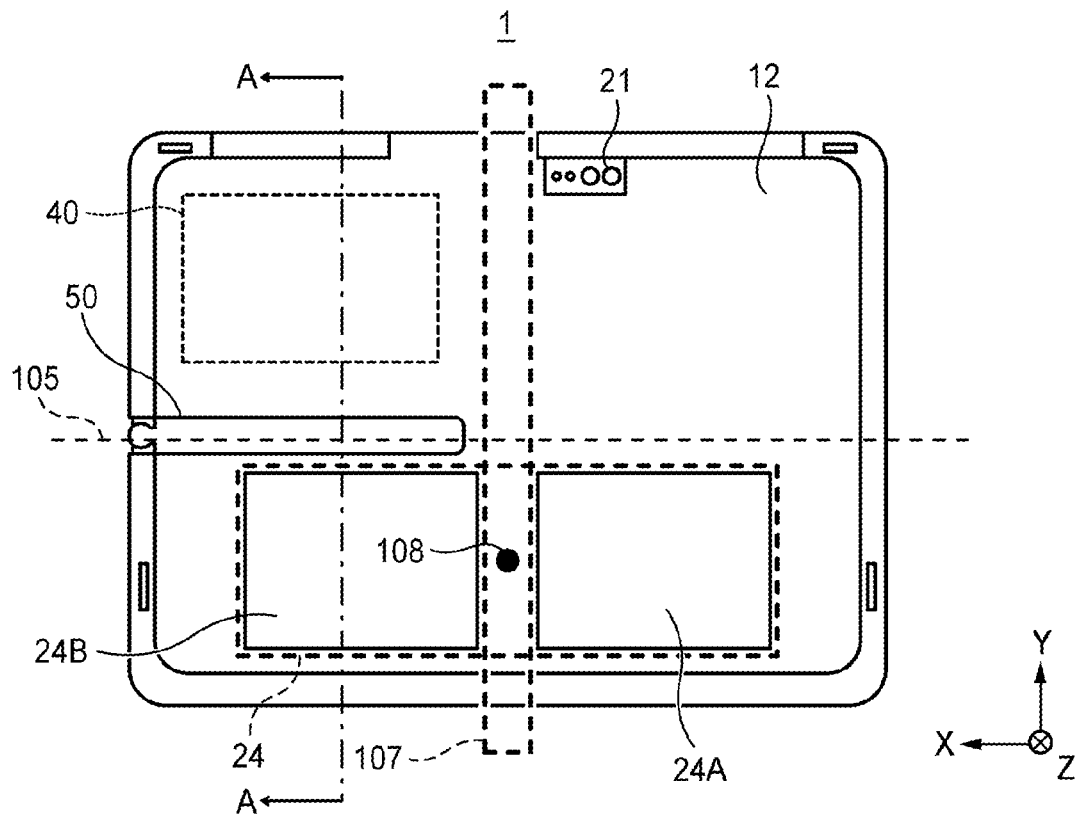
FIG. 3 is a rear view showing the example of the external appearance of the wireless communication terminal according to the embodiment.
Figure 4:
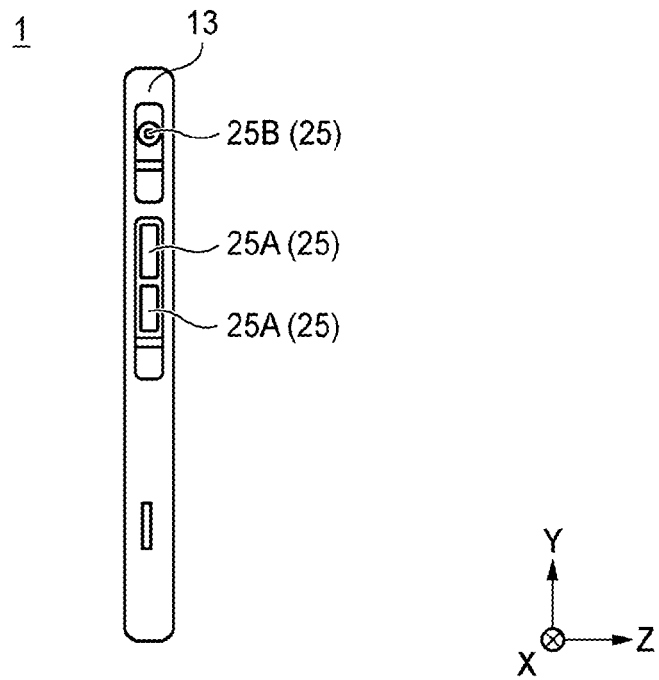
FIG. 4 is a left side view showing the example of the external appearance of the wireless communication terminal according to the embodiment.
Figure 5:
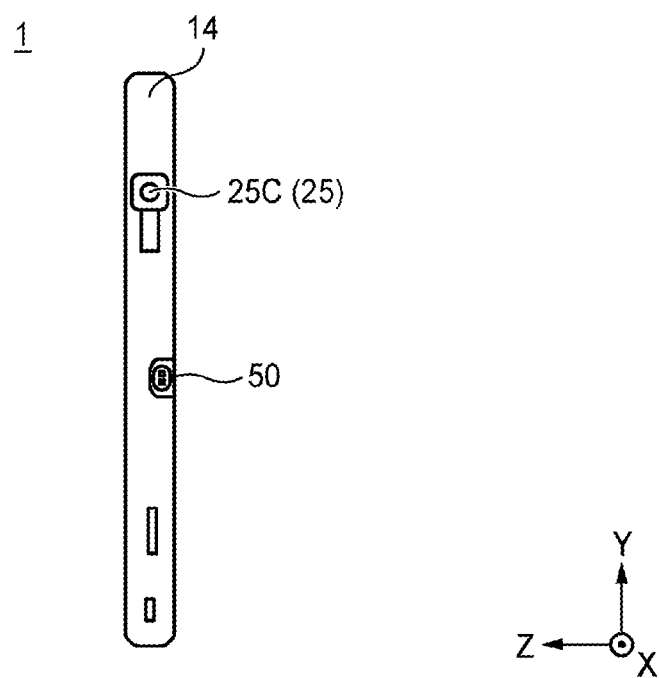
FIG. 5 is a right side view showing the example of the external appearance of the wireless communication terminal according to the embodiment.
Figure 6:
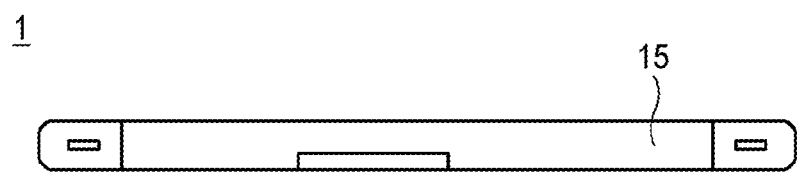
FIG. 6 is a plan view showing the example of the external appearance of the wireless communication terminal according to the embodiment.
Figure 6:
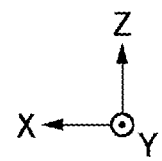
Figure 7:
FIG. 7 is a bottom view showing the example of the external appearance of the wireless communication terminal according to the embodiment.
Figure 7:
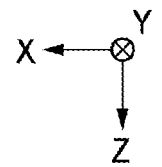

FIGS. 1 to 7 are diagrams showing an example of an external appearance of a wireless communication terminal according to an embodiment. FIG. 1 is a perspective view. FIG. 2 is a front view. FIG. 3 is a rear view. FIG. 4 is a left side view. FIG. 5 is a right side view. FIG. 6 is a plan view. FIG. 7 is a bottom view.

In the description of the present disclosure, in the drawings, a positive direction of an X-axis may be referred to as right, a negative direction of the X-axis may be referred to as left, a positive direction of a Y-axis may be referred to as up, a negative direction of the Y-axis may be referred to as down, a positive direction of a Z-axis may be referred to as front, and a negative direction of the Z-axis may be referred to as a depth.

The wireless communication terminal 1 is an example of an electronic device and is, for example, a smartphone, a mobile phone, a digital camera, a portable personal computer, or a wireless device. In the present embodiment, the tablet wireless communication terminal 1 having performances such as shock resistance, vibration resistance, drip-proof and dust-proof and having a weight heavier than a general terminal will be described. The wireless communication terminal 1 can be used in a harsh environment for the electronic device, such as a factory, a construction site, public safety work, and transportation work. The wireless communication terminal 1 is not limited to business use and may be used by an individual.

<Body>

As shown in FIGS. 1 to 7, a body 10 of the wireless communication terminal 1 is a flat box, and includes a front surface 11 that is a surface disposed on front of the body 10, a back surface 12 that is an inner surface of the body 10, a left side 13 that is a surface of the body 10 on a left side, a right side 14 that is a surface of the body 10 on a right side, a top surface 15 that is a surface of the body 10 on an upper side, and a bottom surface 16 that is a surface of the body 10 on a lower side.

As shown in FIG. 2, a shape of the front surface 11 is a horizontally long rectangle in which a top edge and a bottom edge are longer than a left edge and a right edge and corners are rounded. The shape of the front surface 11 is not limited to a rectangle and may be a square with rounded corners.

A touchscreen 17 used for both input and display is attached to a center of the front surface 11. For example, the touchscreen 17 is configured by a combination of a display device such as a liquid crystal panel or an organic electro luminescence (EL) panel and a position input device such as a touchpad. The display device that constitutes the touchscreen 17 may be read as another term such as a screen, a display, and a monitor.

As shown in FIG. 2, a shape of the touchscreen 17 is a horizontally long rectangle in which a top edge and a bottom edge are longer than a left edge and a right edge. For example, an aspect ratio of the touchscreen 17 is 16:10. The touchscreen 17 is attached such that a top edge or a bottom edge of the touchscreen 17 is parallel to a top edge or a bottom edge of the front surface 11. A length of a diagonal line of the touchscreen 17 is 7 inches or more, for example, 7 inches or 10.1 inches.

As shown in FIG. 3, a shape of the back surface 12, similar to the shape of the front surface 11, is a horizontally long rectangle in which a top edge and a bottom edge are longer than a left edge and a right edge and corners are rounded. When the shape of the front surface 11 is a square with rounded corners, the shape of the back surface 12 may also be a square with rounded corners.

As shown in FIG. 4, a shape of the left side 13 is a vertically long rectangle in which a left edge of the front surface 11 and a left edge of the back surface 12 are long and corners are rounded. As shown in FIG. 5, a shape of the right side 14 is a vertically long rectangle in which a right edge of the front surface 11 and a right edge of the back surface 12 are long and corners are rounded.

As shown in FIG. 6, a shape of the top surface 15 is a horizontally long rectangle in which a top edge of the front surface 11 and a top edge of the back surface 12 are long and corners are rounded. As shown in FIG. 7, a shape of the bottom surface 16 is a horizontally long rectangle in which a bottom edge of the front surface 11 and a bottom edge of the back surface 12 are long and corners are rounded.

In the description of the present disclosure, as shown in FIG. 2, an area between the bottom edge of the front surface 11 and the bottom edge of the touchscreen 17 is referred to as a lower area 101. An area between the top edge of the front surface 11 and the top edge of the touchscreen 17 is referred to as an upper area 102. An area between the left edge of the front surface 11 and the left edge of the touchscreen 17 is referred to as a left area 103. An area between the right edge of the front surface 11 and the right edge of the touchscreen 17 is referred to as a right area 104.

An imaginary line that passes through a center point 106 of the front surface 11 and is parallel to the top edge and the bottom edge of the front surface 11 is referred to as a center line 105. A strip-shaped imaginary area that includes the center point 106 of the front surface 11, has a width of 2 cm in a horizontal direction (X direction), and extends in a vertical direction (Y direction) is referred to as a strip-shaped area 107. The width of the strip-shaped area 107 may be larger or smaller than 2 cm.

A width W1 of the lower area 101 in the vertical direction (Y direction) is larger than a width W2 of the left area 103 and the right area 104 in the horizontal direction (X direction). Accordingly, since an aspect ratio of the front surface 11 is close to a square as compared with the aspect ratio of the touchscreen 17, the weight balance of the wireless communication terminal 1 is stable, and the user can easily operate the wireless communication terminal 1 while carrying and gripping the wireless communication terminal 1.

An antenna for wireless communication (not shown) may be provided in the vicinity of the top surface 15 of inside of the body 10, the left side 13 and/or the right side 14. The antenna corresponds to, for example, wireless communication based on Wi-Fi (registered trademark), Bluetooth (registered trademark), long term evolution (LTE), a fourth-generation mobile communication system (4G) and/or a fifth-generation mobile communication system (5G).

<Camera>

As shown in FIG. 3, a camera 21 is attached to the back surface 12 of the body 10. For example, the camera 21 is attached to an area of the back surface 12 that faces the area between the top edge of the front surface 11 and the top edge of the touchscreen 17 (that is, the upper area 102). An optical axis of the camera 21 is perpendicular to the back surface 12. The user grips left and right sides of the body 10 with both hands and directs the back surface 12 toward an object to be imaged, so that the camera 21 can image the object.

<First Button>

As shown in FIG. 2, at least one first button 22 is attached to the front surface 11 of the body 10. In FIG. 2, six first buttons 22 are attached. For example, the first buttons 22 are attached to the lower area 101. One of the first buttons 22 (for example, the rightmost first button 22) may be a power key for turning on/off a power supply of the wireless communication terminal 1. A shape of a first button 22 is a horizontally long rectangle. However, the shape of the first button 22 is not limited to the rectangle and may be, for example, a square, a circle, or an ellipse.

<Second Button>

As shown in FIG. 2, at least one second button 23 is attached to the front surface 11 of the body 10. The second button 23 is attached to at least one of the left area 103 and the right area 104 of the front surface 11. In FIG. 2, the second buttons 23 are attached to both the left area 103 and the right area 104. A shape of a second button 23 is a vertically long rectangle. However, the shape of the second button 23 is not limited to the vertically long rectangle and may be, for example, a horizontally long rectangle, a square, a circle, or an ellipse.

At least one of the second buttons 23 may be assigned a function (for example, a shutter function) for operating the camera 21. A common function may be assigned to the second buttons 23 of both the left area 103 and the right area 104, or different functions may be assigned to the respective second buttons 23 of the left area 103 and the right area 104. Assignment of a function to a second button 23 may be optionally set by the user.

As described above, by attaching the second buttons 23 to the front surface 11 of the body 10, the user can press a second button 23 with a thumb while gripping the body 10 of the wireless communication terminal 1 from left and right sides. That is, operability while the wireless communication terminal 1 is gripped by both hands is improved.

<Substrate>

As shown in FIG. 3, a substrate 40 for controlling the wireless communication terminal 1 is disposed within the body 10 of the wireless communication terminal 1. A position where the substrate 40 is disposed is above a battery storage space 24.

<Battery Storage Space>

As shown in FIG. 3, within the body 10 of the wireless communication terminal 1, two battery storage spaces 24A and 24B for storing batteries are formed side by side in the horizontal direction. In the present disclosure, when the two battery storage spaces 24A and 24B are included in the description, the two battery storage spaces 24A and 24B are referred to as the battery storage space 24. In an area between the bottom edge of the back surface 12 and the center line 105, the battery storage space 24 is formed such that a center point 108 of the battery storage space 24 is positioned in the belt-shaped area 107.

Accordingly, by forming the battery storage space 24 on a lower side of the body 10, the weight balance of the wireless communication terminal 1 while the batteries are mounted is stable, and an operation by the user while carrying and gripping the wireless communication terminal 1 becomes easy.

A power terminal of the battery stored in the battery storage space 24A and a power terminal of the battery stored in the battery storage space 24B face each other. A wiring (for example, a flexible cable) that connects the power terminals of the batteries to the substrate does not intersect a pen storage space 50 in a plan view parallel to the back surface 12. Accordingly, the pen storage space 50 that does not interfere with the wiring that connects the power terminals of the batteries to the substrate 40 can be formed.

<Pen Storage Space>

Figure 8:
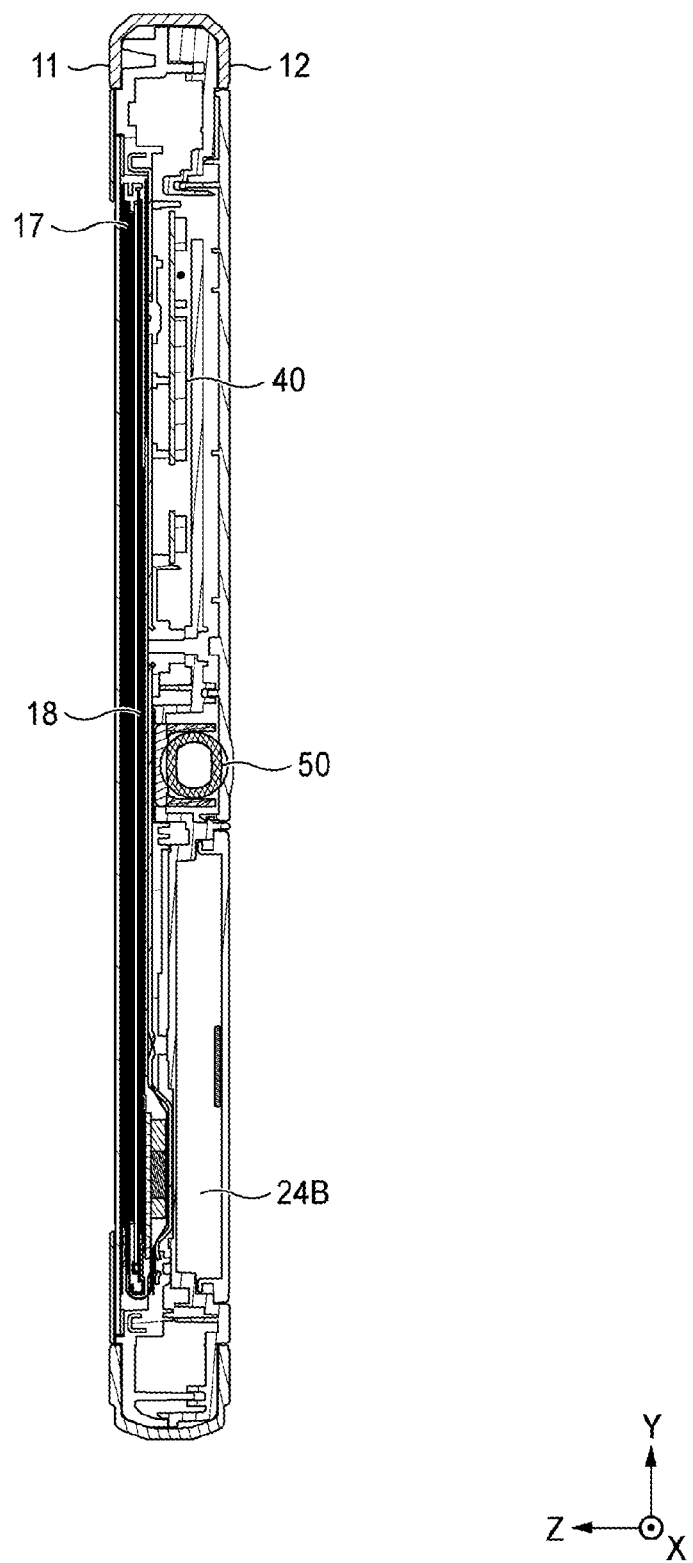
FIG. 8 is a cross-sectional view taken along a line A-A of the wireless communication terminal shown in FIG. 3.

FIG. 8 is a cross-sectional view taken along a line A-A of the wireless communication terminal shown in FIG. 3. Next, the pen storage space will be described with reference to FIGS. 3, 5, and 8.

As shown in FIGS. 3 and 8, the pen storage space 50 for storing the pen used for an operation of the touch panel 17 is hollow from the right side 14 of the body 10 of the wireless communication terminal 1 to an inside of the body 10. A longitudinal axis of the pen storage space 50 is parallel to a top surface of the battery storage space 24.

As shown in FIGS. 3 and 8, a position where the pen storage space 50 is formed is a space between the back surface 12 and a metal member 18 disposed to face a back surface of the touch panel 17, and is within an area between a bottom edge of the substrate 40 and a top edge of the battery storage space 24. The metal member 18 is, for example, a sheet metal. As shown in FIG. 3, a longitudinal length of the pen storage space 50 may be equal to or smaller than a length from the right edge of the back surface 12 to a right edge of the belt-shaped area 107.

The pen storage space 50 may be hollow from the left side 13 of the body 10 to an inside of the body 10. A shape of a cross-section of the pen storage space 50 may be circular or polygonal. The pen storage space 50 may be provided with a claw for pressing the inserted pen. The pen may be read as another term such as a stylus, a stylus pen, or a touch pen.

Accordingly, the pen storage space 50 is formed, so that the wireless communication terminal 1 can be achieved in which components such as the antenna, the substrate 40, and/or the batteries are arranged at appropriate positions and the pen is easily taken out while gripping the body 10.

(Summary of Present Disclosure)

A wireless communication terminal (1) according to one aspect of the present disclosure includes: a flat box-shaped body (10); a touch panel (17) attached to a front surface (11) of the body; a battery storage space (24) that is formed within the body and is for storing a battery; and a pen storage space (50) that is hollow from a left side (13) or a right side (14) of the body to an inside of the body and is for storing a pen used for an operation of the touch panel. A shape of the touch panel is a rectangle in which a top edge and a bottom edge are longer than a left edge and a right edge. A width in a vertical direction of a lower area that is an area between a bottom edge of a front surface and the bottom edge of the touch panel is larger than both a width in a horizontal direction of a left area that is an area between a left edge of the front surface and a left edge of the touch panel and a width in the horizontal direction of a right area that is an area between a right edge of the front surface and a right edge of the touch panel. A position of the battery storage space is within an area between a bottom edge of a back surface of the body and a center line that passes through a center point of the front surface and is parallel to a top edge or the bottom edge of the front surface. A center point of the battery storage space is within a belt-shaped area having a width of 2 cm that includes the center point of the front surface and spreads in the horizontal direction. A longitudinal axis of the pen storage space is parallel to a top surface of the battery storage space. A position of the pen storage space (50) may be between a metal member (18) disposed to face a back surface of the touch panel (17) and the back surface (12). The wireless communication terminal (1) further includes a substrate (40) disposed within the body (10). A position of the substrate is above the battery storage space (24). The position of the pen storage space may be within an area between the bottom edge of the substrate and a top edge of the battery storage space. According to this configuration, the wireless communication terminal (1) can be achieved in which components such as the substrate (40) and/or batteries are arranged at appropriate positions and the pen is easily taken out while gripping the body (10).

Two batteries are stored side by side in the battery storage space (24). Power terminals of the two stored batteries face each other. A wiring that connects the power terminals to the substrate (40) may not intersect the pen storage space (50) in a plan view parallel to the back surface (12). According to this configuration, the pen storage space (50) that does not interfere with the wiring that connects the power terminals of the batteries to the substrate (40) can be formed.

The wireless communication terminal (1) further includes a camera (21) that is attached to the back surface (12) of the body (10) and has an optical axis perpendicular to the back surface. A position of the camera may be within an area of the back surface facing an upper area (102) that is an area between the top edge of the front surface (11) and the top edge of the touch panel (17).

The wireless communication terminal (1) further includes at least one first button (22) attached to the front surface (11) of the body (10). A position of the first button may be within the lower area (101).

The wireless communication terminal (1) further includes at least one second button (23) attached to the front surface (11) of the body (10). A position of the second button may be within an area between the center line (105) and a line obtained by extending the top edge of the touch panel (17), in the left area (103) or the right area (104). The center line (105) passes through a center point (106) of the front surface and is parallel to the top edge or the bottom edge of the front surface.

Although the embodiment has been described above with reference to the accompanying drawings, the present disclosure is not limited to such examples. It will be apparent to those skilled in the art that various changes, modifications, substitutions, additions, deletions, and equivalents can be conceived within the scope of the claims, and it should be understood that such changes and the like also belong to the technical scope of the present disclosure. Components in the above-described embodiment may be optionally combined within a range not departing from the spirit of the invention.

The present disclosure is useful in a field of an electronic device that can be operated with a pen.

The invention claimed is:

1. A wireless communication terminal comprising:
   a body that is a flat box;
   a touch panel that is on a front surface of the body;
   a battery storage space that is a space in the body;
   a pen storage space that is a space in the body for storing a pen for the touch panel, the pen storage space being hollow from a left or right side of the body to an inside of the body; and
   a substrate that is disposed within the body, wherein:
   the touch panel is rectangular with a top edge of the touch panel and a bottom edge of the touch panel that are longer than a left edge of the touch panel and a right edge of the touch panel,
   an upper area is on the front surface of the body and is an area between a top edge of the front surface and the top edge of the touch panel,
   a lower area is on the front surface of the body and is an area between a bottom edge of the front surface and the bottom edge of the touch panel,
   a left area is on the front surface of the body and is an area between a left edge of the front surface and the left edge of the touch panel,
   a right area is on the front surface of the body and is an area between a right edge of the front surface and the right edge of the touch panel,
   a width of the lower area is wider than both a width of the left area and a width of the right area,
   the battery storage space is in a space in the body between a center line of the body and a bottom edge of a back surface of the body, the center line passes through a center point of the front surface of the body, and the center line is in parallel with the top edge of the front surface or the bottom edge of the front surface, a center point of the battery storage space is within a belt-shaped area having a width of 2 cm that spreads in a left-right direction, and the belt-shaped area includes the center point of the front surface of the body, a longitudinal axis of the pen storage space is parallel to a top of the battery storage space, the substrate is in a space in the body above the battery storage space, the pen storage space is in a space between a bottom edge of the substrate and a top edge of the battery storage space, two batteries are stored side by side in the battery storage space, and power terminals of the two batteries face each other, and a wiring connects the power terminals to the substrate and does not intersect the pen storage space.

2. The wireless communication terminal according to claim 1, further comprising:

a metal member that is arranged so as to face a back surface of the touch panel, wherein:

the pen storage space is in a space in the body between the back surface of the body and the metal member.

3. The wireless communication terminal according to claim 1, further comprising:

a camera that is on the back surface of the body, the camera having an optical axis perpendicular to the back surface of the body, wherein:

the camera is in an area opposite the upper area.

4. The wireless communication terminal according to claim 1, further comprising:

a first button that is in the lower area of the front surface of the body.

5. The wireless communication terminal according to claim 4, further comprising:

a second button that is in the front surface of the body, wherein:

the second button is in an area between the center line of the body and a line that extends from the upper edge of the touch panel, the center line passes through the center point of the front surface of the body, and the center line is in parallel with the top edge of the front surface or the bottom edge of the front surface.

* * * * *